April 8, 1958 W. R. AIKEN 2,830,226

ELECTRONIC DEVICE

Filed June 10, 1955 3 Sheets-Sheet 1

INVENTOR.
WILLIAM R. AIKEN

BY James E. Toomey

April 8, 1958 W. R. AIKEN 2,830,226

ELECTRONIC DEVICE

Filed June 10, 1955 3 Sheets-Sheet 2

INVENTOR
WILLIAM R. AIKEN

BY James E. Toomey

ATTORNEY

April 8, 1958 W. R. AIKEN 2,830,226

ELECTRONIC DEVICE

Filed June 10, 1955 3 Sheets-Sheet 3

INVENTOR.
WILLIAM R. AIKEN

BY James E. Toomey

United States Patent Office 2,830,226

Patented Apr. 8, 1958

2,830,226

ELECTRONIC DEVICE

William R. Aiken, Los Altos, Calif., assignor, by mesne assignments, to Kaiser Industries Corporation, a corporation of Nevada Application June 10, 1955, Serial No. 514,653

29 Claims. (Cl. 315—21)

Figure 1:
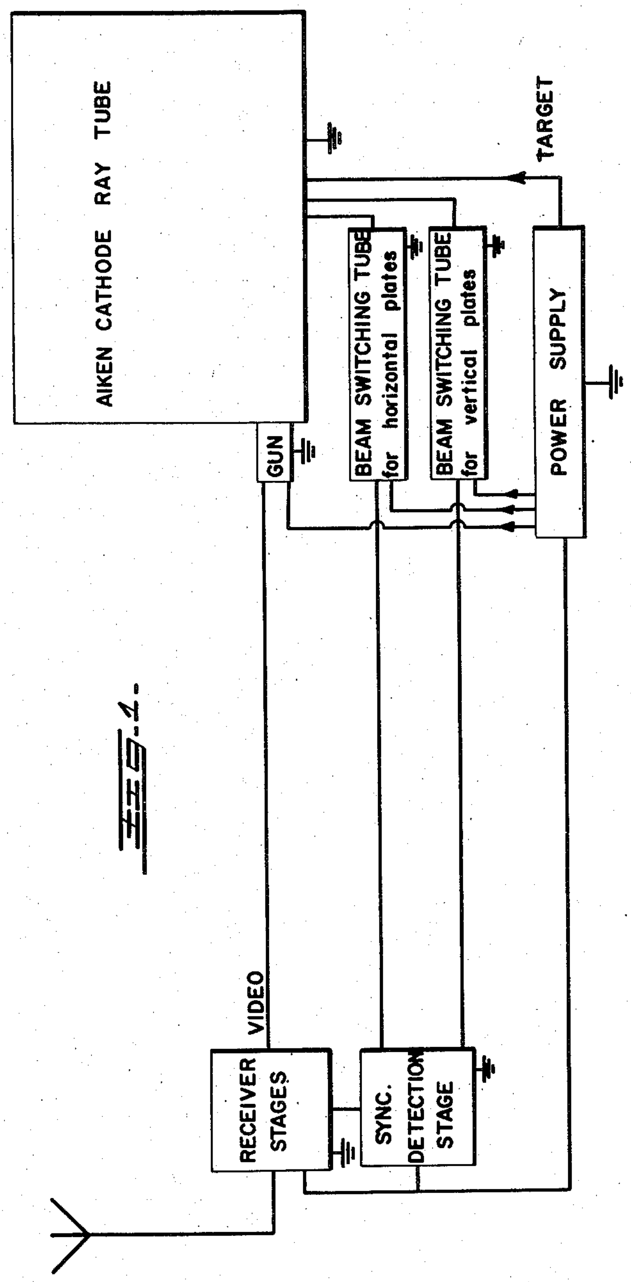

The present invention relates to space discharge apparatus, and more particularly to a beam switching tube having a plurality of anodes which are caused to be cyclically struck by a moving beam of electrons to thereby effect corresponding potential variations on associated circuitry interconnected therewith.

The apparatus comprising the present invention is particularly useful in connection with the application of operating signals to the horizontal and vertical deflection systems of a cathode ray tube of the type disclosed and described in applicant's co-pending applications, Serial Number 355,965, filed May 9, 1953, and Serial Number 396,120, filed December 4, 1953.

An object of the invention is to produce a single tube capable of controlling the application of signal voltages sequentially to the elements of the horizontal and the vertical deflection systems of a television receiver of the type referred to above.

Another object of the invention is to produce a beam switching tube which is readily adapted for use in electronic systems in which the application of signal voltages to successive ones of associated circuit is desirable.

A further object of the invention is to produce a beam switching tube suitable for automatically and cyclically delivering an output potential wavefom of a predetermined shape and frequency over a plurality of associated circuits in a given sequence.

An additional object of the invention is to produce a beam switching tube of the space discharge type which is of compact and relatively small size, and which is readily and economically manufactured.

There is a known need in the field for a small compact control tube member which is capable of effecting sequential and cyclic control of a plurality of a number of slave circuits. As a specific example of an application for such type control element, reference is made to the novel Aiken-type cathode ray tube which has been recently introduced into the art. In such a tube arrangement, a series of horizontal deflection plates and a series of vertical deflection plates are cyclically energized in a given synchronized sequence, to provide a raster on a target plate. A video signal may be presented on the raster by applying video signals to the tube control gun in the conventional manner.

In the use of the novel cathode ray tube arrangement as a commercial television receiver, a first beam switching tube is connected to the horizontal deflection plates to cyclically effect the application of a changing potential signal to the successive horizontal deflection plates, and a second beam switching tube is connected to the vertical deflection plates to cyclically effect the application of a changing potential signal to the successive vertical deflection plates. The two control tubes in such arrangement will, of course, have different time cycling periods, and may have a different number of anode elements, the number of anode elements in each control tube corresponding to the number of deflection plates to be controlled thereby. Generally stated, the beam switching tube for the horizontal deflection plates will be designed to cycle at a speed which is substantially two hundred and fifty times the speed of the beam switching tube which is connected to control the vertical deflection plates. Also, in the Aiken-type tube, the horizontal control tube will be arranged to provide signals of a somewhat lower voltage than the vertical control tube.

If desired, of course, the control arrangement for the cathode ray tube may utilize one of the novel beam switching tubes to control one of the deflection plate sets and conventional control circuitry to control the second set of deflection plates.

In other applications, as for example, certain radar embodiments which are arranged to present target positions on a coordinate type screen, the beam switching tubes for the horizontal and vertical deflection plates may have like cycling periods.

Other applications and arrangements within the scope of the invention will be obvious to parties familiar with the art.

In certain embodiments of the Aiken-type tube, it is advantageous to effect an overlapping energization of each of the deflection plates of a set. That is, the energization of the next plate in an operating sequence is initiated before the prior plate in the sequence reaches its maximum value of energization. A feature of the present invention is the manner in which the overlapping operation is readily accomplished by the employment of the novel beam switching tube.

The use of the novel control tube in these and other applications, and the structure and operating characteristics of the novel tube are now set forth in their broader concepts.

*General description*

In its broadest concept, the present invention contemplates an evacuated envelope having disposed therewith a plurality of plates formed in two staggered or offset rows. One row of plates comprises an electron beam deflection plate set and the other row comprises target plates upon which the deflected electron beam is caused to cyclically impinge. Each of the plates of the deflection plate set is electrically connected to a respective offset plate in the row of target plates upon which the electron beam is caused to impinge. A source of electrons is provided to deliver a beam of electrons along a path intermediate the two rows of plates. A starter plate is disposed within the tube envelope adjacent the row of deflection plates at the position most distant from the source of electrons and is maintained at a potential negative with respect to the beam potential.

In operation, the beam of electrons is caused to travel in a "field-free" region intermediate the plates to the region of the starter plate. Being maintained at a potential negative with respect to the beam, the field established by the starter plate causes the beam to be repelled and thereby impinge upon the first target plate opposite and offset from the starter plate. The electron beam establishes a discharge circuit for the impinged plate to discharge same, and inasmuch as it is electrically connected to a staggered or offset plate in the opposite row, the staggered interconnected plate is discharged a similar amount. As the potential of the offset plate is made more negative, the electron beam is deflected further in the direction of the beam origin until it impinges on the plate adjacent the plate first impinged by the beam. The second plate and its associated target plate to which it is electrically coupled are discharged in the manner of the first set. Obviously, this action of the tube automatically causes the electron beam to be deflected and to impinge on each of the target plates in succession until the target plate closest to the source is discharged by impingement of the beam on the plate closest to the source of electrons. At this time a signal is provided to interrupt the electron beam for a period long enough to insure a complete recharge of all the plates and the cycle is repeated once again.

Figure 2:
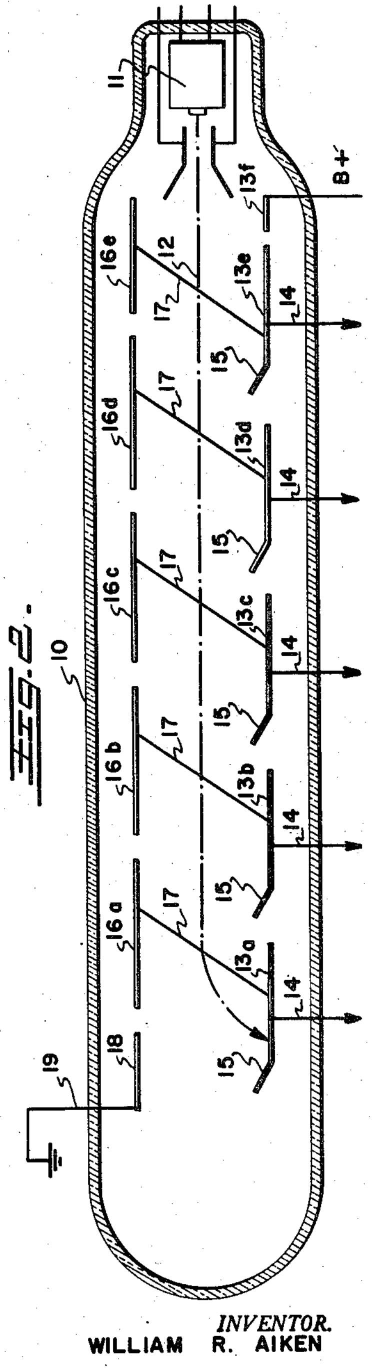
Figure 3:
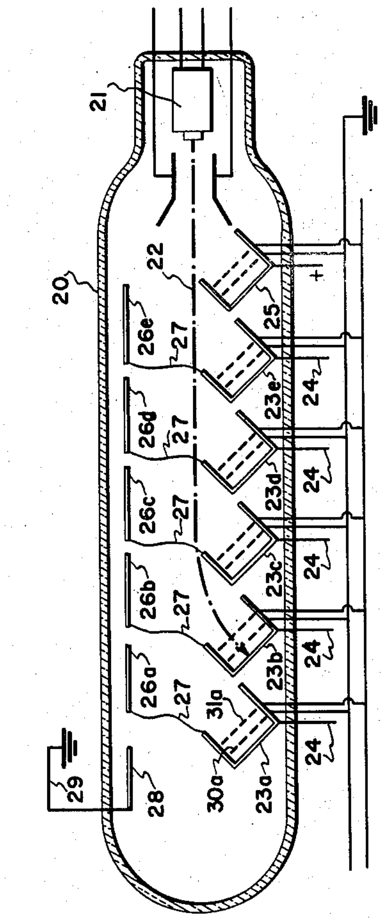
Figure 7:
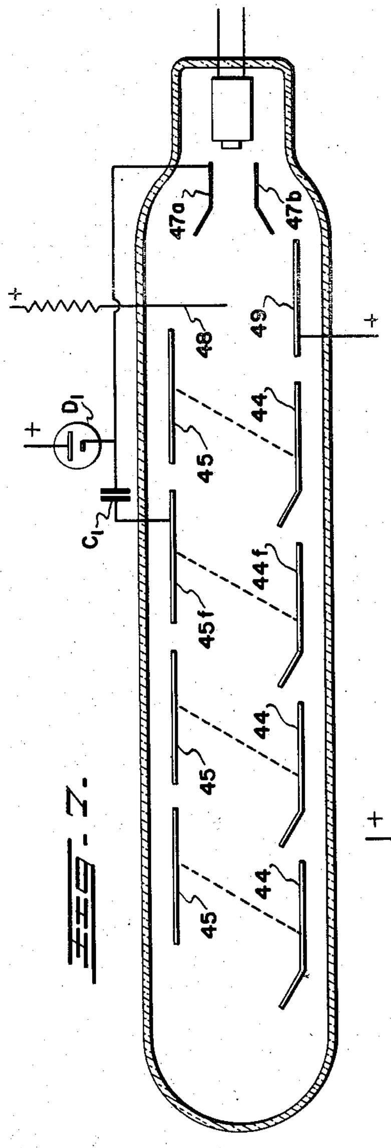
Figure 4:
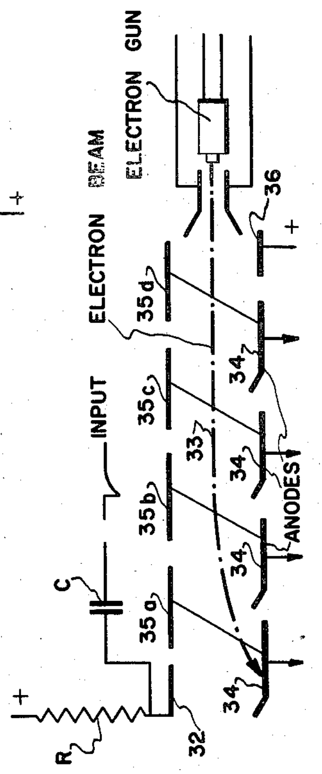
Figure 8:
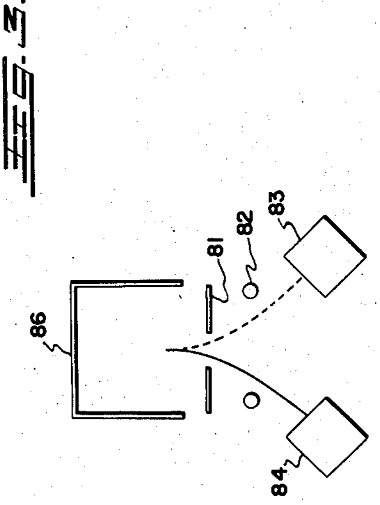
Figure 5:
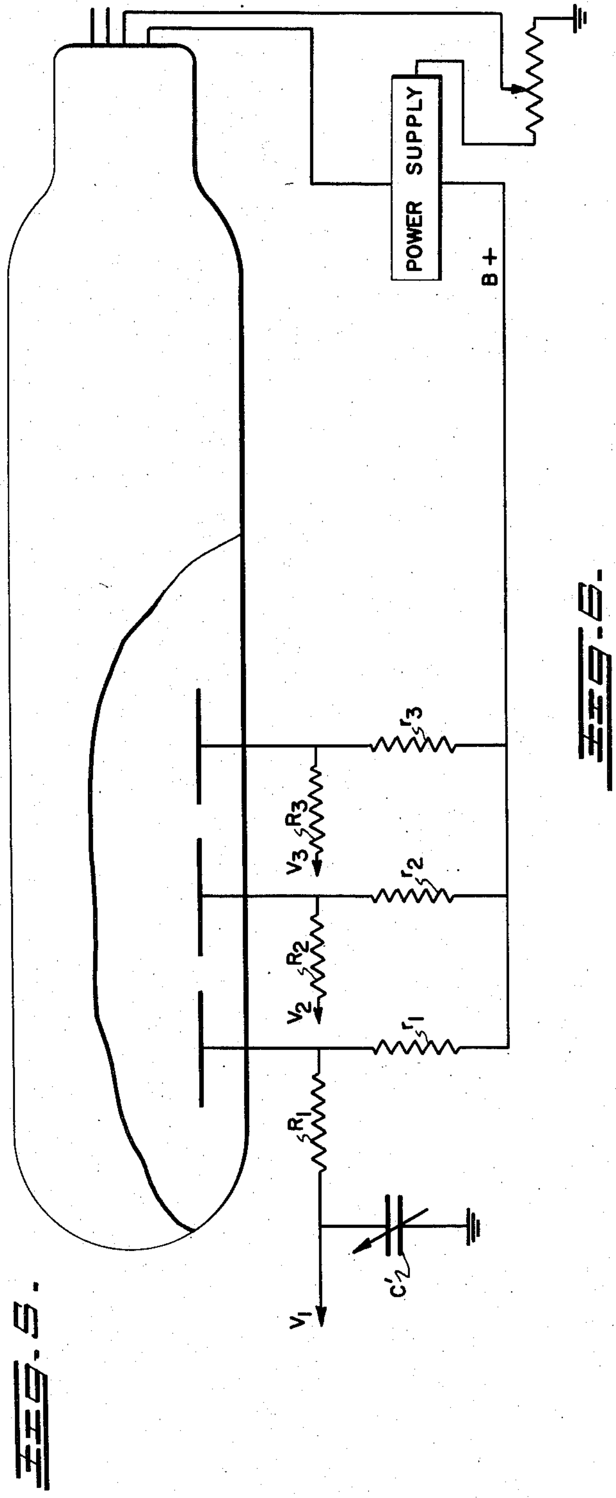
Figure 6:
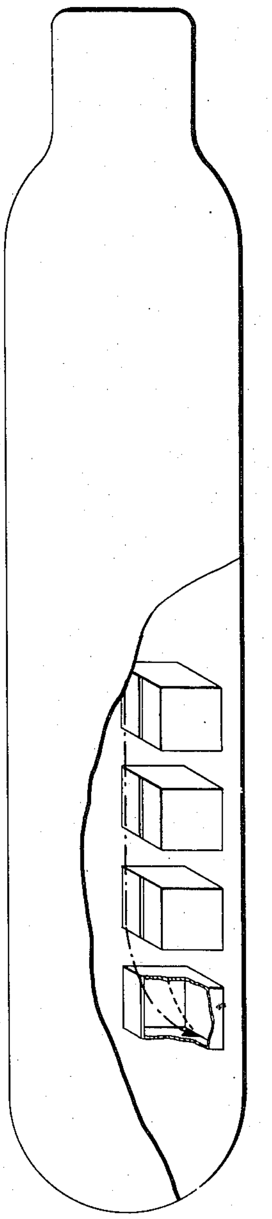

Each of the target plates is connected to electrical conductors which extend exteriorly through the tube wall to a B+ supply source. A slave circuit is also connected to each of the anode supply circuits and the variable potential signal produced by the tube in each plate is extended thereover to associated equipment connected thereto. The specific nature of the structure and its operation will be apparent with reference to the following description and claims and drawings in which:

Figure 1 is a block diagram showing a system incorporating the beam switching control tube of the instant invention, Figure 2 is a side view of one embodiment of the beam switching tube partially cut-away to enable a complete disclosure of the internal components, Figure 3 is a side view of another embodiment of the tube partially cut-away showing the screen and suppressor grid elements, Figure 4 is a diagrammatic showing of the beam switching tube illustrating a wave initiating circuit, Figure 5 is a diagrammatic showing of a beam switching tube connected to supply signals to the vertical deflection plates of an Aiken-type tube, Figure 6 is a side view of the target plates according to one embodiment of the invention, Figure 7 is a diagrammatic showing of the beam switching tube illustrating an arrangement for terminating the flow of electrons within the tube for a period of time permitting the plates to be recharged, and Figure 8 is an end view of a beam switching tube employing an angular offset to reduce its length.

There is set forth initially herein, a teaching of the manner in which the beam switching tube of the invention is utilized to successively apply control or deflection voltages to the horizontal and vertical deflection elements of an Aiken-type cathode ray tube, such as described and claimed in the above identified co-pending applications.

With reference to Figure 1, a schematic showing is utilized to teach a system which incorporates the invention in connection with an Aiken-type tube. Basically, the system includes an antenna which is adapted to receive both the sound and the picture of video signal and a set of conventional receiver stages such as the I. F. amplifier, R. F. amplifier, video detector, and the video amplifier stages, etc., of a conventional television receiver, which are interconnected to the antenna by a suitable transmission line.

For purposes of simplification, only the passage of the video portion of the signal through the system is shown and described. Specifically, the incoming sync signal and the video signal are passed to the electron gun of the Aiken-type tube from the receiver stages. The receiver stages simultaneously pass the incoming signal to the sync detection stage which separates the horizontal and vertical control pulses and applies the same over assigned conductors to the associated beam switching control tube. The beam switching tubes in turn effect the synchronized and sequential energization of the horizontal and vertical deflection means of the Aiken-type tube, the control tube for the horizontal plates having operating characteristics consistent with the provision of the raster horizontal line scan at the common television scanning rate, and the control tube for the vertical plate having operating characteristics which are consistent with the provision of a vertical scan at the commercial television scanning rate. In this way, the electron beam in the Aiken tube is synchronized with that in the camera tube at the transmitter.

As the beam in the Aiken tube scans the target area of the tube, the video signal applied to the electron gun produces the proper variations in the beam intensity and so reconstructs the television picture element by element and line by line.

A power supply is provided to apply suitable operating potentials to the beam switching tubes for the horizontal and vertical deflection plates, the receiver stages, the sync detection stage, the electron gun, and the target in the conventional manner.

Referring to Figure 2, the novel beam switching tube comprises an evacuated elongate envelope 10 having disposed therewithin an electron gun 11 of the conventional type. The gun 11 is mounted at one end within the envelope 10 and is adapted to deliver a beam of electrons 12 along a path substantially parallel to the longitudinal axis of the envelope.

A plurality of coplanar anodes **13*a*, 13*b*, 13*c*, 13*d*, and 13*e* are disposed in spaced relation from one another within the envelope 10. The plane in which the anodes 13 reside is in substantially parallel relation with the longitudinal axis of the envelope 10. Connected to each of the anodes 13 are electrically conducting wires 14 which, in turn, are connected to one set of the deflection elements of a cathode ray tube as described in detail in applicant's co-pending applications referred to hereinabove. The marginal edges 15 of each anode 13 are upturned a degree sufficient to cause the electron beam 12 to constantly impinge one or more of the anodes 13**, as will hereafter be pointed out in greater detail.

Disposed in opposition to the anodes 13, there is a plurality of coplanar plates **16*a*, 16*b*, 16*c*, and 16*d* spaced from one another within the envelope 10. The plates 16 are in substantially parallel relation with the anodes 13 and are spaced therefrom to permit the electron beam 12 to travel along a path therebetween. The plate 16 are so arranged with respect to the anodes 13 that there is an offset or staggered relation established between the individual elements 13 and 16. Each of the plates 16 is electrically coupled to its respective offset anode 13 by an electrically conducting wire 17. A starter plate or electrode 18 disposed adjacent one end of the envelope 10 opposite the electron gun 11 is connected to ground potential or at a potential negative with respect to the potential of the cathode through an electrically conducting wire 19**.

The number of plates and anodes may vary in accordance with the nature of application and particular number of slave circuits to be controlled by the tube.

The tube may be connected in the manner shown in Figure 5 to effect the successive energization of the vertical deflection plates of an Aiken-type tube. As there shown, each of the targets is connected over an associated resistor $r_1$, $r_2$, etc., to a $B^+$ power supply. A control or slave circuit is connected between the anode and associated resistor $r_1$, $r_2$, etc., and is utilized to apply the variable potential signal which appears on the target plates of the control tube to the interconnected deflection plates of the cathode ray tube.

More specifically, in operation of the device the electron gun 11 is adapted to deliver an electron beam 12 along a path between the anodes 13 and the plates 16. By virtue of the fact that the individual anodes 13 and the plates 16 are electrically coupled together in pairs, the potential on any one of the plates 16 will be equal to the potential on its respective anode 13. Assuming that each of the anodes 13 as connected to the $B^+$ supply source are at a potential of a predetermined value, as for example 800 volts positive potential, their respective plates 16 will likewise be at 800 volts positive potential. Inasmuch as in this state there is no potential gradient between the anodes 13 and the plates 16, a "field-free" region is established in the envelope 10 in the region defined by the anodes 13 and the plates 16. Accordingly, the beam 12 will initially be enabled to travel along a path in the region between the anodes 13 and the plates 16 without being caused to be deflected or affected in any way by spurious electric fields until it enters the region defined by the starter plate 18. The starter plate 18 being maintained at a potential negative with respect to the beam 12 establishes a repelling field with respect to the beam. Accordingly, as the beam 12 approaches and enters the negative electric field of the starter plate 18, it is caused to be deflected toward and impinge upon the anode 13*a*. Upon the impingement of electrons on the anode 13*a*, the potential thereupon commences to change in a negative direction which change effects a similar change of potential on the plate 16*a* which is electrically coupled to the anode 13*a*.

As the electrons of the beam 12 impinge upon the anode 13*a* for a continued time period, the anode 13*a* is further discharged and effects a similar discharge of the plate 16*a* causing an increasingly stronger negative repelling electric field to be established in the region of the plate 16*a*. The increasingly stronger negative field exhibited by the plate 16*a* causes the beam 12 to be deflected in an advancing manner toward a position on the anode 13*a* which is continuously closer to the electron gun 11 until a portion of the deflected beam 12 is caused to impinge upon the upturned marginal edge 15 of the next adjacent anode 13*b*.

The electrons which strike the anode 13*b* cause the anode to discharge and simultaneously causes a similar discharge of the plate 16*b*. A negative field is established by plate 16*b* which becomes stronger as its associated anode 13*b* is struck by an increasingly larger amount of the beam. The increasingly stronger negative field established by plate 16*b* causes the beam 12 to be deflected more sharply so as to successively impinge upon portions of the anode 13*b* continuously more until it impinges upon the upturned marginal portion 15 of the next adjacent anode 13*c*. This deflection action re-occurs cyclically across all the anodes 13*a* through 13*d*. Plate 13*f* is connected to a B+ power source to provide a constant electron attractive source. However, the operation of the tube is such that the electron beam never impinges on plate 13*f*.

It is apparent that during the period that an anode is struck by the beam, the slave circuit will exhibit a negative slope wave, the potential dropping from 800 volts toward the zero value. The time constant (sharpness of the slope) for the signal wave can, of course, be modified by the proper selection of the current and the capacitance of an RC circuit, such as is shown connected in the control path which extends to the first vertical deflection plate $V_1$. Adjustment of the wave shape for the individual deflection plates can, of course, be accomplished by adjusting the value of the variable capacitor and resistor elements of the individual RC circuits. Preferably, the wave shape can be adjusted by modifying the electron beam current by changing the grid voltage and using the capacitance existing in the circuit.

Upon impingement of the electron beam 12 on the last anode (13*e* in the illustrated embodiment), a sync signal (which in the use of the control tube with a television receiver set may be the sync signal from the television transmitting station) is applied to the control grid of the electron gun 11 to effectively and momentarily interrupt the flow of electrons therefrom for a sufficient period to allow restoration of the full potential value to each of the anodes 13, the original voltage being 800 volts positive potential in the example given herein. At the instant the system has been completely recharged, the sync signal is removed from the control grid of the electron gun 11 permitting the electron beam 12 to pass through the tube to the region of the field established by the starter plate 18 and repeat its successive automatic sweep across the anodes 13.

By virtue of the upturned edges 15, the beam trajectory is such as to cause the entire electron beam 12 to continuously impinge the surface of at least one of the anodes 13 at every instant of beam flow. It will be discerned that the continuous impingement effect of the beam on at least one of the anodes results in a smooth and continuous output potential waveform which is taken off of the output conductors 14, and greatly minimizes the loss of current which would occur if the beam were to strike the insulating spaces between the targets.

With reference to Figure 3, there is shown another embodiment of the beam switching control tube having increased deflection sensitivity. The tube includes an evacuated elongate envelope 20 having disposed therewithin an electron gun 21 of the conventional type. The electron gun 21 is mounted at one end of the envelope 20 and is adapted to deliver a beam of electrons 22 along a path substantially parallel to the longitudinal axis of the tube envelope.

A plurality of coplanar anodes 23*a*, 23*b*, 23*c*, 23*d*, and 23*e* are disposed in spaced relation from one another within the envelope. The plane in which the anodes 23 reside is at substantially 45° with relation to the longitudinal axis of the envelope 20. Connected to each of the anodes 23 are electrically conducting wires 24 which, in turn, are connected to the deflection elements of a cathode ray tube of the type described in detail in applicant's co-pending applications referred to hereinabove. When the beam 22 is caused to be deflected from its initial path which is substantially parallel to the longitudinal axis of the tube, the trajectory thereof is such as to cause the entire electron beam to continuously impinge upon the bottom surface of at least one of the anodes 23.

Disposed in opposition to the anodes 23, there is a plurality of coplanar plates 26*a*, 26*b*, 26*c*, 26*d*, and 26*e* spaced from one another and in substantially parallel relation with the longitudinal axis of the envelope 20. The plates 26 are so disposed with relation to the anodes 23 to permit the passage of the electron beam 22 along a path therebetween. The plates 26 are so arranged with respect to the anodes 23 that there is an offset or staggered relation established between the individual elements 23 and 26. Each plate 26 is electrically coupled to its respective offset anode 23 by an electrically conducting wire 27. A starter plate or electrode 28 disposed adjacent one end of the envelope 20 opposite the electron gun 21 is connected to ground potential or maintained at a potential negative with respect to the potential of the cathode through an electrically conducting wire 29.

A plurality of suppressor grids 30 are respectively disposed in each of the anodes 23 and are parallel to and spaced from the bottoms thereof. A plurality of screen grids 31 are respectively disposed in coextensive relation with respect to the suppressor grids 30 and substantially parallel to and spaced therefrom above. Each of the grids 30 and 31 are connected to a source of potential outside the tube envelope through wiring shown diagrammatically on the drawing. In one embodiment the screen grids are maintained at the voltage of the deflection plates, and the suppression grids are maintained at zero volts.

In operation, the electron gun 21 is adapted to deliver an electron beam 22 along a path between the anodes 23 and the plates 26. By virtue of the fact that the individual anodes 23 and the plates 26 are electrically coupled together in pairs, the potential on any one of the plates 26 will be substantially the same as the potential on its respective anode 23. Assuming that each of the anodes 23 are charged initially to a chosen value, as for example 800 volts positive potential, their respective plates 26 will be charged likewise to 800 volts positive potential. The screen grids 31 are also charged to 800 volts. Accordingly, the beam 22 will initially be enabled to travel along a path in the region between the anodes 23 and the plates 26 without being caused to be deflected or affected in any way by spurious electric fields until it enters a region defined by the starter plate 28. The starter plate 28, being maintained at a potential negative with respect to the grid 31a and beam 22, establishes a repelling field with respect to the beam. Accordingly, as the beam 22 approaches and enters the negative electric field of the starter plate 28, it is caused to be deflected to impinge on the anode 23a which is in an offset relation with respect to the starter plate 28 and closer to the beam source. When the electron beam 22 impinges upon anode 23a, the charge thereon commences to change in the negative direction. Inasmuch as the anode 23a is electrically coupled to the plate 26a, as the anode 23a commences to discharge, the plate 26a is likewise discharged establishing a negative electric field in the region thereof causing the electrons of the beam 22 to be repelled and more sharply bend and impinge upon the anode 23a along the path continuously closer to the electron source. As more electrons of the beam 22 impinge upon the anode 23a, the plate 26a becomes increasingly more negative with respect to the beam thereby causing the beam 22 to be continuously deflected to a position of impingement on the anode 23a which is likewise continuously closer to the electron gun 21, until a portion of the deflected beam 22 is caused to impinge on the next adjacent anode 23b.

It will be apparent to those skilled in the art that the inclusion of a screen grid provides more sensitive deflection arrangement. Further, the inclusion of suppressor grids 30 with the screen grids 31 (as included in the structure of Figure 3) will tend to minimize and reduce the spurious secondary emission effects which may occur as a result of the emission of the electrons from the metal surface of the targets which are under bombardment by electrons. A further arrangement which may be used to minimize secondary emission effects is shown in Figure 6. As there shown, the targets are formed in the shape of cubes with a slotted channel in the top side of each cube. The targets are supported as a linear array with the slotted channel of each target positioned laterally of the beam path.

As the beam is prjected along its path the starter electrode deflects the beam end into registration with the first target which is furthest from the beam source. As the deflecting force applied to the beam increases as a result of the impingement of the beam end upon the first target, the beam end advances along the bottom of the first target. At this time, the second target intercepts the beam, and the beam advances along it in a like manner.

It is apparent to the skilled that a cup-shaped anode will tend to reduce the amount of current lost by secondary emission.

Continuing now with the description of the operation of the tube as shown in Figure 3 or as modified by the inclusion of the cube-shaped slotted targets of Figure 6, the beam 22, after the anode 23a has completely discharged, will be caused to be further deflected and impinge upon the anode 23b. The plate 26b which is associated and electrically connected to the anode 23b becomes more negative causing the beam to be more sharply deflected and impinge upon various portions of the anode 23b closer to the electron gun 21. It must be pointed out that the deflection action repeats cyclically across the entire row of anodes 23a through 23e. Anode 25 is connected to a B+ power source to provide a constant electron attractive source. However, the operation of the tube is such that the electron beam never impinges on anode 25.

Upon impingement of the electron beam 22 upon the anode 23e, a sync signal is applied to the control grid of the electron gun 21 to effectively and momentarily interrupt the flow of electrons therefrom a sufficient period to permit all of the anodes 23 to be raised to the initial voltage (800 volts positive potential in the example given herein). When the system has been fully raised to the stated potential, the sync signal is removed from the control grid of the electron gun 21, permitting the electron beam 22 to repeat its successive automatic sweep across the anodes 23, specifically from the anode 23a to anode 23e.

The rate at which the electron beam 22 would sweep across the entire row of anodes 23 to vary their voltage would be primarily dependent upon the value of the capacity of the anodes 23 and the plates 26, the current value of the electron beams, and if desired, by circuit control means of the type shown connected in Figures 4 or 5.

Figure 4 shows another method for initiating the operation of the tubes shown and is described with reference to Figures 2 and 3. Specifically, a sync signal may be applied to the starter plate 32 which is electrically connected to a conventional RC differentiating circuit. In operation, the sync signal is applied to the input of the RC circuit comprising R and C, and then impressed on the starter plate 32 which causes a negative electric field to be established in the region thereof which repels the electron beam 33 toward and into impingement with the first anode 34a. The repelling field established by the starter plate 32 is maintained for a period sufficient to allow the impinged anode 34a and its associated offset plate 35 to discharge an amount sufficient for the negative field provided the first plate 35a to become effective in the deflection of the electron beam 33. The beam 33 is then caused to automatically and successively bombard the entire row of anodes 34 in the manner described in connection with the embodiment described in reference to Figures 2 and 3.

Figure 7 shows a further method for terminating the flow of electrons from the electron gun for a period of time sufficient to permit the anodes 44 and their associated plates 45 to assume the initial potential value prior to the commencement of an additional sweep of the targets by the electron beam 43. The next to the last of the deflection plates 45f is connected through condenser $C_1$ to diode $D_1$ which is in turn connected to a power source of, for example, 1000 volts. Diode $D_1$ is also connected to deflection plate 47a of the electron gun. In operation, when the electron beam strikes anode 44f which is connected to the next to last of the deflection plates 45f, it discharges both that anode and its connected deflection plate. When this happens it causes a voltage drop across $C_1$ proportionate to the voltage drop on deflection plate 45f and, as explained earlier herein, the beam then shifts to the next anode closer to the gun. Plate 85 is then recharged. The corresponding positive pulse is passed to $C_1$ and also to the diode $D_1$. The resultant electron flow causes a large positive pulse to the deflection plate of the electron gun causing it to be deflected upwardly and impinge on shield 48, thus effectively cutting off the electron beam. When the electron beam is cut off, all of the anodes and deflection plates are recharged and since no further positive pulse is applied to the deflection plate 47a, the electron beam then recommences its path in a direction parallel to the longitudinal axis of the tube envelope and the cycle of the control tube is recommenced.

Alternatively, plate 45f and its associated cut-off circuitry could be connected to the cathode of the electron gun. Then when the positive pulse was passed to the cathode, the electron beam would be cut off. In this alternative system the shield 48 would not be required.

In Figure 8 there is shown a method for reducing the length of the control tube. Since these control tubes may be used in rather complex circuitry where a large number of various circuits are to be controlled, it is obvious that such tubes could be so long that they would be awkward to construct or to use. Accordingly, the tube length may be cut almost in half by spacing the targets in two rows parallel to the electron beam but at opposite sides of the electron tube. As is well known to those skilled in the art, there must be a definite spacing between such targets in order to prevent arcing. This spacing is generally in direct proportion to the size of the potential placed upon the targets. Therefore, the number of targets within a given length of electron tube can be almost doubled by alternatively spacing the targets on opposite sides of the tube provided means is employed for deflecting the beam from one side to the other side of the tube. The deflection plates 86 are formed in the shape of "hats" or short three-sided channels, all disposed in spaced relationship and in a line parallel to the direction of the electron beam. The targets 83 and 84 are disposed on either side and below the electron beam in two different rows also parallel to the direction of the electron beam. Each target is, of course, spaced from its adjacent target a sufficient distance to prevent arcing. In order to deflect the electron beam from one side to the other, a slotted accelerator 81 is employed together with focusing grids 82. This method of focusing and deflecting an electron beam is described in co-pending application Number 396,120, filed December 4, 1953. By applying suitable voltages to the slotted electrode 81, the electron beam is focused to a fine line. By applying a positive potential to one of the focusing grids 82 and a negative potential to the other of the focusing grids 82, the electron beam is caused to deflect in a direction away from the negative one of the pair of grids and toward the positive of said pair of grids. The grids 82 are deployed in a discontinuous fashion so that the potential alternates from plus to minus on each sequential pair of grids. In this manner, the electron beam is caused to deflect from one side to the other as it proceeds down the length of the electron tube in an automatic and cyclical manner. Obviously, other methods for disposing the targets in a non-continuous linear fashion will occur to those skilled in the art and may be employed in a similar fashion for the purpose of conserving space in tubes of this type.

What is claimed is:

1. A beam switching tube comprising a starter electrode, a plurality of coplanar target electrodes, an electron beam source means adapted to deliver a pencil beam of electrons along a path parallel and adjacent to said target electrodes, a plurality of coplanar deflection electrodes in adjacent spaced relation with respect to the beam path for effecting deflection of the point end of the beam into registration successively with each of said target electrodes, and means for electrically coupling each of said target electrodes with an associated one of the deflection electrodes.

2. A beam switching tube comprising a starter electrode, a linear array of coplanar target electrodes, an electron beam source means for delivering a pencil beam of electrons along a path substantially parallel and adjacent to said target electrodes, a linear array of coplanar deflection electrodes in spaced and offset relation with respect to said target electrodes disposed such that the beam path lies between said target electrodes and said deflection electrodes, each of said deflection electrodes being electrically coupled to an associated one of the offset target electrodes for effecting successive deflection of the point end of the beam into registration with each of said target electrodes.

3. A beam switching tube comprising a starter electrode, an electron beam source means adapted to deliver a pencil beam of electrons along a path toward said starter electrode, a linear array of target electrodes each disposed at an acute angle to and in parallel spaced alignment along the path of the beam, a linear array of deflection electrodes disposed intermediate said beam source and said starter electrode in substantially parallel spaced alignment along the path of the beam, each deflection electrode being assigned for use with a correspondingly different one of said target electrodes, and means for electrically connecting each of the target electrodes with its preassigned one of the deflection electrodes to effect the application of successive deflecting forces to the beam and thereby cause the deflection of the leading portion of the beam into registration with successive ones of said target electrodes.

4. In a control tube for use in controlling the operation of associated equipment, beam source means for delivering a beam along a given path, a plurality of targets disposed adjacent said path, a plurality of deflection electrodes disposed adjacent said path in spaced relation with said targets, means including said targets for applying control signals to the deflection elements in succession to deflect said beam from said path at different intervals and into registration with said targets successively, control means disposed exteriorly of said tube, and means for connecting said targets to said control means to thereby effect successive signal applications to said control means by said targets.

5. A control tube as set forth in claim 4 in which said targets comprise plates having marginal upturned edges, and which includes means for supporting the targets in adjacent relation with the marginal edge of each succeeding target in the sequence disposed to intercept the beam prior to the complete traversal by the beam of the preceding target in the sequence.

6. A control tube as set forth in claim 4 in which each of said targets comprises a box-like cup having a top side which is slotted to provide an orifice, said orifice being disposed parallel to the longitudinal direction of said beam, and means for supporting said target in adjacent relation to the beam source.

7. A control tube as set forth in claim 4 which includes means for supporting said targets in sufficient proximity to permit striking by the beam at times of two of said targets.

8. In a control tube adapted for cyclic operation, means for initiating the cycling of the tube, beam source means for delivering a beam along a given path, a plurality of targets disposed adjacent said path, a plurality of deflection electrodes including a starter electrode disposed adjacent said path in spaced relation with said targets for applying deflecting forces to said beam to deflect said beam from said path at different intervals and into registration with said targets successively, a plurality of control paths extending exteriorly of said tube, and means for connecting each target to an individual control path to thereby effect signal application to the successive ones of said paths.

9. In a control tube, beam source means for delivering a pencil beam along a given path, a plurality of targets disposed adjacent said path, a plurality of deflection electrodes disposed adjacent said path in spaced relation with said targets, means including said targets for applying control signals to the deflection elements in succession to deflect the tip portion of said beam from said path to strike said targets successively, a plurality of control paths extending exteriorly of said tube, and means for connecting each target to an individual one of said control paths to thereby effect signal application in succession to the successive ones of said paths.

10. In a control tube adapted for cyclic operation, beam source means for delivering a beam along a given path, a plurality of targets disposed in more than one row adjacent said path, a plurality of deflection electrodes disposed adjacent said path in spaced relation with said targets, means for initiating each tube cycle by bending said beam into registration with one of said targets, means including said targets and electrical conductors coupling each of said targets to respective ones of said electrodes for applying control signals to the deflection elements in succession to deflect said beam from said path at different intervals to strike said targets successively, a plurality of control paths extending exteriorly of said tube, and means for connecting each target to an individual control path to thereby effect signal application to the successive ones of said paths.

11. A method of cyclically delivering a variable signal to each of a number of paths which comprises the steps of delivering a pencil beam into a field free zone existing between a plurality of initially charged, spaced target electrodes coupled with overlapping oppositely disposed deflection elements; deflecting the leading portion of said beam into impingement with one of said target electrodes to vary the potential value thereon and on its associated deflection element, whereby the leading portions of said beam are deflected by said deflection element into registration with the next adjacent target electrode, and delivering the change of potential as it occurs in said target to associated control elements.

12. In a control tube, beam source means for delivering a beam along a given path, a plurality of targets disposed adjacent said path, a plurality of deflection electrodes disposed adjacent said path in spaced relation with said targets, tube cycling means comprising means for initiating a tube cycle by bending said beam into registration with one of said targets, and means including said targets for thereafter applying control signals to the deflection electrode in succession to deflect said beam from its path at different intervals and into registration with said targets successively, a plurality of control paths extending exteriorly of said tube, and means for connecting each target to an indvidual control path to thereby effect signal application to the successive ones of said paths.

13. A control tube as set forth in claim 12 in which said means for initiating a tube cycle comprises a starter electrode, and means for continuously applying a beam deflection signal thereto.

14. A control tube as set forth in claim 12 in which said means for initiating a tube cycle comprises a starter electrode, and means for applying a momentary pulse to said starter electrode to initiate each tube cycle.

15. In a control tube, a plurality of targets, a plurality of deflection electrodes disposed in spaced relation with said targets, a screen grid disposed between each of said targets and said deflection electrodes, source means for delivering a beam between said targets and said deflecting electrodes, means including said targets for applying control signals to the deflection electrodes in succession to deflect said beam from said path and into registration with said targets successively, a plurality of control paths extending exteriorly of said tube, and means for connecting each anode to an individual control path to thereby effect signal application to the successive ones of said paths.

16. A cathode tube arrangement as set forth in claim 15 which includes means for connecting an equal value energizing potential to said targets and said screen grids.

17. A cathode tube arrangement as set forth in claim 15 which includes a suppressor grid connected between each of said screen grids and said targets.

18. In a control tube, beam source means for delivering a beam along a given path, a plurality of targets disposed adjacent said path, a plurality of deflection electrodes disposed adjacent said path in spaced relation with said targets, each one of said targets being connected to a corresponding one of said deflection electrodes signal source means for applying a signal potential to each of said targets and thereby to the interconnected deflection electrodes, means for varying the potential value successively on each target and its interconnected deflection electrodes to cause same to deflect said beam from said path at different intervals and into registration with said targets successively, a plurality of control paths extending exteriorly of said tube, and means for connecting each target to an individual control path to thereby effect application of a variable signal to the successive ones of said paths.

19. A control tube as set forth in claim 18 in which said signal source means comprises means for connecting energizing signals to said targets and said deflection electrodes over said paths.

20. In a control tube, beam source means for delivering a beam along a given path, a plurality of targets disposed adjacent said path, a plurality of deflection electrodes disposed adjacent said path in spaced relation with said targets, each one of said targets being connected to a corresponding one of said deflection electrodes; signal source means for applying a signal potential to each of said targets and thereby to the interconnected deflection electrodes, means for initially bending said beam into engagement with one of said targets to vary the potential value on said target and its interconnected deflection electrode to thereby cause the deflection electrode to deflect said beam from said path at a different interval along its length and into registration with a successive target, each successive target and associated deflection unit being operative successively to control said beam in a like manner, and a plurality of control paths extending exteriorly of said tube, each control path being connected to an individual one of said targets for extending the signals appearing thereon to associated circuitry.

21. In a control tube, beam source means for delivering a beam along a given path, a plurality of targets disposed adjacent said path, a plurality of deflection electrodes disposed adjacent said path in spaced relation with said targets, each one of said targets being connected to a corresponding one of said deflection electrodes, signal source means for applying a potential of a given value to each of said targets and thereby to the interconnected deflection electrodes, means for initially bending said beam into engagement with one of said targets to effect discharging of the potential on said target and its interconnected deflection electrode to thereby cause the deflection electrode to deflect said beam from said path at a different interval along its length and into registration with a successive target, each successive target and associated deflection unit being successively controlled by said beam in like manner, a plurality of control paths extending exteriorly of said tube, means for connecting each target to an individual control path to thereby effect application of a variable signal to the successive ones of said paths, and means for terminating the beam delivery temporarily following a complete cycle of the tube to permit the restoration of each of the targets to said given value.

22. In a control tube, beam source means for delivering a beam along a given path, a plurality of targets disposed adjacent said path, a plurality of deflection electrodes disposed adjacent said path in spaced relation with said targets, tube cycling means comprising means including said targets for applying control signals to the deflection electrodes in succession to deflect said beam from said path at different intervals and into registration with said targets successively in each tube cycle, a plurality of control paths extending exteriorly of said tube, means for connecting each successive target to a successive one of the control paths to thereby effect successive signal applications to said paths, and means for adjusting the cycle time of said tube.

23. An arrangement as set forth in claim 22 in which said means for adjusting the cycle time for said tube comprises an adjustable RC network connected in at least one of said control paths.

24. In a control tube, beam source means for delivering a beam along a given path, a plurality of targets disposed adjacent said path, a plurality of deflection electrodes disposed adjacent said path in spaced relation with said targets, tube cycling means comprising means including said targets for applying control signals to the deflection electrodes in succession to deflect said beam from said path at different intervals and into registration with said targets successively, a plurality of control paths extending exteriorly of said tube, an RC circuit connected in at least one of said control paths, and means for connecting each target to associated control means to thereby effect successive signal application to the connected control means by said tube.

25. In a control tube, beam source means for delivering a beam along a given path, a plurality of targets disposed adjacent said path, a plurality of deflection electrodes disposed adjacent said path in spaced offset relation with said targets, tube cycling means including means for applying a given potential to said targets and said deflection electrode means, means for applying a control signal to said beam to deflect said beam from its path and into registration with one of said targets to vary the potential thereon, whereby the interconnected deflection electrode is operated to bend the beam into registration with the succeeding target to effect a variance of the potential thereon, each successive target and deflection electrode being thus operative to cause the beam to be bent from its path at a different point along its length and thereby successively advance over each of the tube targets, and sync means for blanking said beam with completion of each tube cycle, a plurality of control paths extending exteriorly of said tube, and means for connecting each target to an individual control path to thereby effect signal application to the successive ones of said paths.

26. A control tube as set forth in claim 25 in which said sync means comprises a pulse producing circuit connected to one of the last targets struck by the beam in each cycle, and means for connecting said pulse producing circuit to interrupt delivery of said beam over said path for a given time period.

27. A control tube as set forth in claim 25 in which said sync means comprises a pulse producing circuit connected to one of the last plates struck by said beam in each cycle, a blanking shield, and means connecting the output of said pulse producing circuit to said source to deflect said beam from its path into registration with said shield for a period sufficient to permit restoration of said potential to all of said targets.

28. In a control tube for controlling the deflection plates of a cathode ray tube, beam source means for delivering a beam along a given path, a plurality of targets disposed adjacent said path, a plurality of deflection electrodes disposed adjacent said path in spaced relation with said targets, means including said targets for applying control signals to the deflection electrodes in succession to deflect said beam from its path at different intervals and into registration with said targets successively, a plurality of control paths extending exteriorly of said tube, each path being connected between an individual one of said cathode ray tube deflection plates and an individual one of said targets to thereby effect signal application to the successive ones of said deflection plates.

29. A control tube as set forth in claim 27 which includes means for connecting said beam source to the sync stage of a television receiver set.

References Cited in the file of this patent

UNITED STATES PATENTS

| | | |
|---|---|---|
| 2,205,071 | Skellett | June 18, 1940 |
| 2,563,807 | Alfven et al. | Aug. 14, 1951 |